(No Model.)

B. S. WOOD.
VEHICLE WHEEL.

No. 558,890.  Patented Apr. 21, 1896.

WITNESSES:
Harry J. Garceau
Edward C. Allen

INVENTOR:
Brown S. Wood
BY Henry Marsh Jr.
ATTY.

UNITED STATES PATENT OFFICE.

BROWN S. WOOD, OF JOHNSTON, RHODE ISLAND, ASSIGNOR TO HERBERT B. WOOD, OF SAME PLACE.

VEHICLE-WHEEL.

SPECIFICATION forming part of Letters Patent No. 558,890, dated April 21, 1896.

Application filed February 17, 1896. Serial No. 579,524. (No model.)

*To all whom it may concern:*

Be it known that I, BROWN S. WOOD, a citizen of the United States, and a resident of Johnston, in the county of Providence, in the State of Rhode Island, have invented a new and useful Vehicle-Wheel, of which the following is a specification.

My invention relates to wheels adapted for practical and efficient use on all classes of vehicles.

The object of my invention is to provide a wheel in which the spokes will yield resiliently and relieve the vehicle from jolting, jarring, and strain caused by passing over obstructions or irregularities in the road, while said spokes are adequately supported to prevent them from buckling under lateral or other strains.

To these ends my invention consists in the special and novel construction of the spokes and their combination and arrangement with the hub and rim of the wheel, as is hereinafter more fully set forth.

Figure 1:
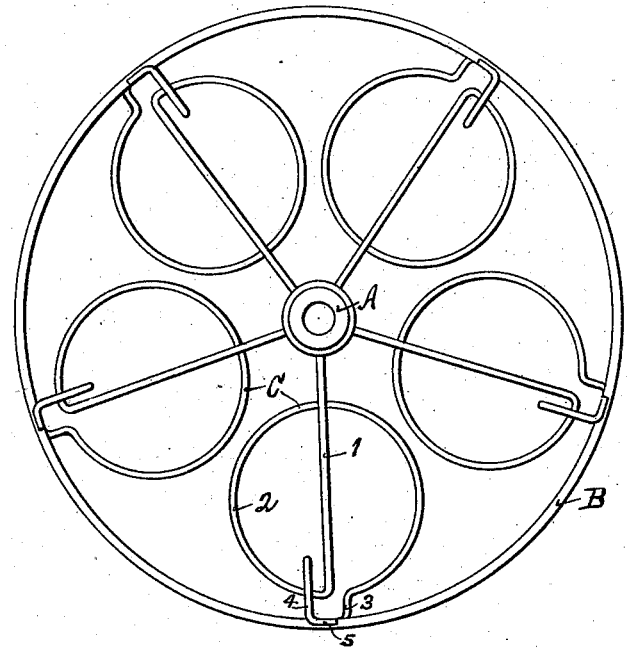
Figure 2:
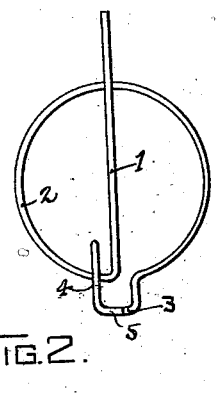
Figure 3:
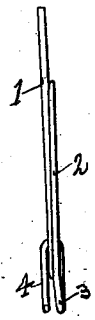
Figure 4:
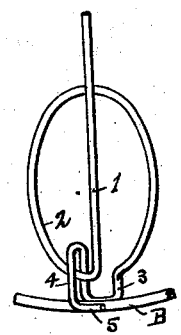

In the accompanying drawings, illustrating my invention, Figure 1 is an elevation of my newly-invented wheel. Fig. 2 is an elevation of one of the wheel-spokes. Fig. 3 is an edge view of the same. Fig. 4 is a perspective view of the same and a portion of the rim of a wheel.

Similar letters and numerals of reference indicate like parts where they occur in the drawings.

A represents the hub, and B the rim, of a wheel. These are of the ordinary form and of any suitable material or size. The rim is non-elastic.

The spokes C, I construct, preferably, of spring metal in the form substantially as shown, having a straight portion 1, which is rigidly secured to and extends radially from the hub to within a proper distance from the rim, where it is bent at nearly or quite a right angle and carried in a regular curve crossing and overlying said straight portion 1 until it assumes the form of nearly a complete circle, as 2, when it is bent, as shown, to form a downwardly-extending loop, as 3, substantially in the plane of said circular portion and again bent to form an upwardly-extending loop, as 4, adjacent to the straight portion 1, and serving to confine one part of the circular portion of the spoke, and finally bent to form an end, as 5, parallel with the lower portion of said loop 3 and adapted to serve in conjunction therewith as a means for rigidly securing the rim and spoke together at that point. It will thus be seen that the spoke C is rigidly secured to the hub and rim, and that its curved portion 2, passing through the loop 4, is thereby supported and the rim held in the plane of the straight portion of the spoke, while said circular portion 2 has free movement within said loop in the plane of the wheel.

The radius of the circular portion 2 is limited only by the necessity that it be not so large as to permit the springs to come into contact with each other or with the hub and rim. The distance between the said circular portion and the hub and between said circular portion and the rim should be sufficient to allow free action of that member of the spoke at all times, and the loop 4 should be of sufficient height to allow such free action within it.

Ordinarily a vehicle-wheel in passing over irregularities in the roadway receives an upward and backward jar, which is unpleasantly communicated to the vehicle with more or less injury to its parts. In my invention the spokes yield in both-named directions, and as they all act in unison they relieve the vehicle from jarring or jolting. The obstruction causes the circular or spring portion of all the spokes to act at the same time, thereby forcing the hub out of the true center of the wheel until the obstruction is passed, when all the parts will resume their normal positions. The construction and arrangement of the spokes are such that obviously the rim can partially rotate around the hub to relieve the hub of the backward jar. Said spring portions of the spokes acting together, as stated, distribute the burden of relieving the vehicle of jar and also of restoring the hub to its normal position after the obstruction is passed.

I claim as my invention and desire to secure by Letters Patent—

1. In a vehicle-wheel, a spoke having a rigid straight portion, as 1, a circular spring portion, as 2, crossing and overlying said straight portion adjacent to the center of the wheel, a loop, as 3, projecting substantially in the plane of the wheel and affording means for the rigid attachment of the spoke to the rim, and a loop, as 4, rigidly secured to the rim and projecting therefrom toward the center of the wheel, and inclosing said circular portion at a point adjacent to said straight portion, and adapted to serve, as specified, to confine said spoke and rim in the plane of the wheel.

2. Combined with the hub and rim of a wheel, a spoke having a rigid straight portion and a circular spring portion crossing and overlying said straight portion intermediately of the hub and rim, and a loop rigidly secured to the rim and projecting therefrom toward the center of the wheel in a plane at right angles to the plane of said circular portion and inclosing the latter, as shown, and adapted to serve, as specified, to partially lock the spoke and rim together and thereby confine the rim in the line of the wheel.

3. A vehicle-wheel consisting of a hub and rim combined with a spoke having a rigid straight portion secured to and extending radially from the hub, a circular spring portion crossing and overlying said straight portion intermediately of the hub and rim, means for rigidly securing said spoke to the rim, and other means as a loop rigidly secured to said rim and projecting therefrom toward the center of the wheel in a plane at right angles, or nearly so, to the plane of the wheel and inclosing said circular portion near its junction with said straight portion, all arranged and adapted to serve, as specified to permit the rim to partially rotate around the hub of the wheel.

In testimony whereof I have hereunto set my hand, in presence of two witnesses, this 15th day of February, 1896.

BROWN S. WOOD.

Witnesses:
HENRY MARSH, Jr.,
EDWARD C. ALLEN.